United States Patent
Kim et al.

(10) Patent No.: US 9,847,637 B2
(45) Date of Patent: Dec. 19, 2017

(54) CHANGEOVER METHOD OF HVDC TRANSMISSION SYSTEM

(71) Applicant: LSIS CO., LTD., Anyang-si, Gyeonggi-do (KR)

(72) Inventors: Eung Soo Kim, Gyeonggi-do (KR); Jong Bae Kim, Seoul (KR); Seung Hun Lee, Gyeonggi-do (KR)

(73) Assignee: LSIS CO., LTD., Anyang-si (KR)

( * ) Notice: Subject to any disclaimer, the term of this patent is extended or adjusted under 35 U.S.C. 154(b) by 334 days.

(21) Appl. No.: 14/684,133

(22) Filed: Apr. 10, 2015

(65) Prior Publication Data

US 2015/0295404 A1 Oct. 15, 2015

(30) Foreign Application Priority Data

Apr. 14, 2014 (KR) ........................ 10-2014-0044184

(51) Int. Cl.
*H02J 1/10* (2006.01)
*H02J 1/00* (2006.01)
*H02J 3/00* (2006.01)
*H02J 3/36* (2006.01)
*H02J 13/00* (2006.01)

(52) U.S. Cl.
CPC ................ *H02J 1/00* (2013.01); *H02J 3/006* (2013.01); *H02J 3/36* (2013.01); *H02J 13/00* (2013.01); *Y02E 60/60* (2013.01); *Y04S 10/525* (2013.01)

(58) Field of Classification Search
CPC ..... H02J 1/10; H02J 1/102; H02J 7/35; Y02E 60/12; G06F 1/26
USPC ..................................................... 307/43, 64
See application file for complete search history.

(56) References Cited

U.S. PATENT DOCUMENTS

| | | | | |
|---|---|---|---|---|
| 7,526,639 | B2 * | 4/2009 | Duron | G06F 9/4401 713/1 |
| 8,558,408 | B2 * | 10/2013 | Carter | H02J 9/06 307/43 |
| 2002/0065053 | A1 * | 5/2002 | Zhang | H01Q 1/2291 455/78 |
| 2003/0188222 | A1 * | 10/2003 | Abbondanzio | G06F 11/2028 714/12 |

(Continued)

FOREIGN PATENT DOCUMENTS

| | | |
|---|---|---|
| CN | 101390265 | 3/2009 |
| CN | 101542885 | 9/2009 |

(Continued)

OTHER PUBLICATIONS

European Patent Office Application Serial No. 15162781.7, Search Report dated Jun. 26, 2015, 5 pages.

(Continued)

*Primary Examiner* — Quan Tra
(74) *Attorney, Agent, or Firm* — Lee, Hong, Degerman, Kang & Waimey PC (57) ABSTRACT

A changeover method of a high voltage direct current (HVDC) transmission system is provided. A first system is set to an active state. A ready signal is transmitted from the first system to a first COL. A ready detection signal and an active signal are transmitted to the first system, in response to the ready signal. A confirm signal is transmitted to the first system in response to the active signal when the ready detection signal matches the ready signal.

5 Claims, 12 Drawing Sheets

(56) References Cited

U.S. PATENT DOCUMENTS

| | | | | |
|---|---|---|---|---|
| 2006/0271810 A1* | 11/2006 | Hsu | ......................... | G06F 1/263 |
| | | | | 714/4.11 |
| 2009/0063739 A1* | 3/2009 | Weddle | .............. | G05B 19/0421 |
| | | | | 710/110 |
| 2010/0157633 A1* | 6/2010 | Bjorklund | ................. | H02J 3/36 |
| | | | | 363/74 |
| 2015/0149781 A1* | 5/2015 | Logue | ................ | H04W 52/0212 |
| | | | | 713/171 |
| 2015/0181640 A1* | 6/2015 | Kwong | ................. | H04W 28/18 |
| | | | | 370/329 |

FOREIGN PATENT DOCUMENTS

| | | |
|---|---|---|
| DE | 2448717 | 4/1976 |
| JP | 8-65897 | 3/1996 |
| KR | 10-1998-0019255 | 5/1998 |
| KR | 10-2005-0079588 | 8/2005 |
| KR | 10-0673535 | 1/2007 |
| KR | 10-0725775 | 6/2007 |
| KR | 10-2008-0085915 | 9/2008 |
| KR | 10-2008-0088661 | 10/2008 |
| KR | 10-2011-0014087 | 2/2011 |
| KR | 10-1144217 | 5/2012 |
| KR | 10-2013-0115776 | 10/2013 |
| KR | 10-2013-0121368 | 11/2013 |

OTHER PUBLICATIONS

Korean Intellectual Property Office Application Serial No. 10-2014-0044184, Notice of Allowance dated Dec. 16, 2015, 2 pages.
State Intellectual Property Office of the People's Republic of China Application Serial No. 201510255553.6, Office Action dated Jan. 5, 2017, 6 pages.
Korean Intellectual Property Office Application Serial No. 10-2014-0044184, Office Action dated Aug. 17, 2015, 4 pages.

* cited by examiner

CHANGEOVER METHOD OF HVDC TRANSMISSION SYSTEM

CROSS REFERENCE TO RELATED APPLICATIONS

Pursuant to 35 U.S.C. §119(a), this application claims the benefit of earlier filing date and right of priority to Korean Patent Application No(s). 10-2014-0044184, filed on Apr. 14, 2014, the contents of which are all hereby incorporated by reference herein in its entirety.

BACKGROUND

The present disclosure relates to a changeover method using a changeover logic of at least two systems of a high voltage direct current (HVDC) transmission system.

There are two power system interconnection methods, a typical one for interconnecting AC power systems as they are, and the other for interconnecting systems after converting AC power into DC power through a power converter. In recent, an interest in the method of interconnecting power systems after converting the AC power into the DC power is more increasing than the method of interconnecting AC power systems as they are. A high voltage direct current (HVDC) transmission system using a power converter is also installed between Jeju-island and Haenam-gun in Korea to interconnect power systems between Jeju-island and Haenam-gun.

An HVDC transmission method is one of electricity transmission methods and indicates a supply method that converts high voltage AC power generated at the power station into DC power, transmits the DC power and then re-converts into AC power in a desired power receiving region.

The DC transmission method has many advantages.

Firstly, since the size of a DC voltage is just about 70% of the maximum value of an AC voltage, the HVDC transmission system may easily perform device insulation and since there is a low voltage, it is possible to reduce the number of insulators installed in each device and the height of an iron tower.

Since the DC transmission method has less transmission loss than an AC transmission method when the same power is transmitted, the best advantage of the HDVC transmission system is that power transmission efficiency may increase. The HDVC transmission system may transmit two or more times the current of the AC system in the DC system.

Since the HVDC transmission system may reduce wire consumption and the area of a transmission line, it is effective and also possible to enhance the stability of systems by connecting two systems having different voltages or frequencies.

The HVDC transmission system has no constraint on a power transmission distance and the DC transmission method needs inexpensive construction costs in land power transmission exceeding 450 Km or in submarine power transmission exceeding 40 Km as well.

Thus, the HVDC transmission system is used for a power system interconnection method of new renewable energy, especially for power transmission of a large offshore wind farm.

Since in other countries, such as China and India, the distance between a power station and an electricity user is 1000 Km or longer, the prevalence of the HVDC transmission system is rapidly increasing.

Components in the HVDC transmission system including a controller are provided in pairs for the stability of the system, in which case one of a pair of devices is in an active state and the other of the pair of devices is in an inactive state.

An operation that the device being in the active state between a pair of devices changes to the inactive state and simultaneously, the device being in the inactive state changes to the active state is called changeover.

In a typical changeover technique, even if a small glitch or noise occurs on a line to which a signal is input, a changeover logic (COL) obtaining a fault signal changes over the controller.

There is a case when a system actually having a fault transmits the fault signal to the COL, but a normal signal transmitted from a system is deformed to the fault signal and transmitted even when a wire or line transmitting a signal has a physical trouble and thus a glitch or noise occurs.

In this case, the COL obtaining the fault signal determines that the system transmitting the fault signal has a fault.

Thus, since a typical system is vulnerable to the fault, and the COL immediately receives a command provided by the controller and performs a changeover operation, the entire HVDC transmission system excessively depends on the controller capable of malfunctioning, thus unstable and experiences runout.

SUMMARY

Embodiments provide a changeover method of an HVDC transmission system that prevents a changeover logic, the core of a system changeover from determining a false fault signal to be a normal fault signal and thus prevents a system from becoming wrongly changed over to ensure stability and not to significantly affect a changeover time.

In one embodiment, a changeover method of a high voltage direct current (HVDC) transmission system includes: setting a first system to an active state; transmitting a ready signal from the first system to a first COL; transmitting a ready detection signal and an active signal to the first system, in response to the ready signal; and transmitting a confirm signal to the first system in response to the active signal when the ready detection signal matches the ready signal.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

According to an embodiment, a changeover method of a high voltage direct current (HVDC) transmission system including a first system 1, a second system 2, a first changeover logic (COL) 3, and a second COL 4 includes: setting the first system 1 to an active state; transmitting a ready signal from the first system 1 to the first COL 3; transmitting a ready detection signal and an active signal from the first COL 3 to the first system 1, in response to the ready signal; and transmitting a confirm signal from the first system 1 to the first COL 3 in response to the active signal when the ready detection signal matches the ready signal.

According to another embodiment, the changeover method further includes obtaining a fault signal by the first COL 3 and transmitting a fault detection signal from the first COL 3 to the first system 1 in response to the fault signal.

According to still another embodiment, the changeover method further includes transmitting a confirm signal from the first system to the first changeover in response to the fault detection signal, and changing the first system to an inactive state and changing the second system to an active state, in response to the confirm signal.

According to a still another embodiment, the transmitting of the confirm signal from the first system 1 to the first COL 3 includes checking whether the fault detection signal matches the fault signal, and transmitting a confirm signal from the first system 1 to the first COL 3 when the fault detection signal matches the fault signal.

According to a still another embodiment, the changeover method further includes changing the first system 1 to an inactive state and changing the second system 2 to an active state when the confirm signal is not received by the first COL for a time equal to or longer than a critical time after the fault detection signal is transmitted by the first COL 3.

According to still another embodiment, the obtaining of the fault signal by the first COL 3 includes obtaining the fault signal when the first COL fails to receive a specific signal transmitted by the first system 1.

According to still another embodiment, the obtaining of the fault signal by the first COL 3 includes obtaining the fault signal by the first COL 3 when the first system 1 has a fault and transmits the fault signal to the first COL 3.

According to still another embodiment, the changeover method further includes maintaining the inactive state of the first system 1 and the active state of the second system 2 even if the fault signal is not obtained by the first COL 3 after the second system 2 is changed to the active state.

Figure 1:
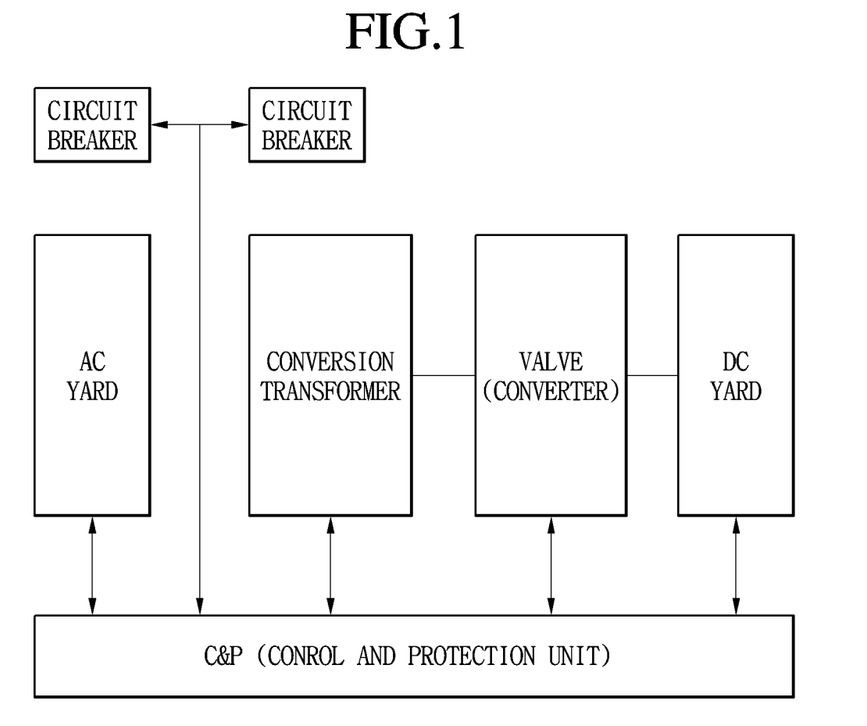
FIG. 1 is a schematic diagram of a general high voltage direct current (HVDC) transmission system.

FIG. 1 is a block diagram of a general HVDC transmission system.

Referring to FIG. 1, a control and protection (C & P) unit plays a role in controlling an AC yard, a conversion transformer (CT.r), a converter (valve), and a DC yard that are the entire components of the HVDC transmission system.

The pair of systems includes the same two systems, i.e., a first system and a second system in order to continuously perform an operation so that when the currently operating system has a trouble, such as system malfunction while providing a system, a standby spare system may continue to provide the service.

In this case, the pair of systems has an active mode and a standby mode, respectively and two systems are logically combined and operate, monitoring each other. The currently operating system is called an active system and a system being in a standby state is called a standby system.

The active system is actually operating and in an active state in a system, performs the input and output of all connected devices and the logic of all connected devices, and provides all operation information to the standby system that is in a standby state.

The standby system awaits in a ready state to become the active system, i.e., in the inactive state, and is ready to immediately change to the active state through synchronization of all data and stage information in the active system.

Figure 2:
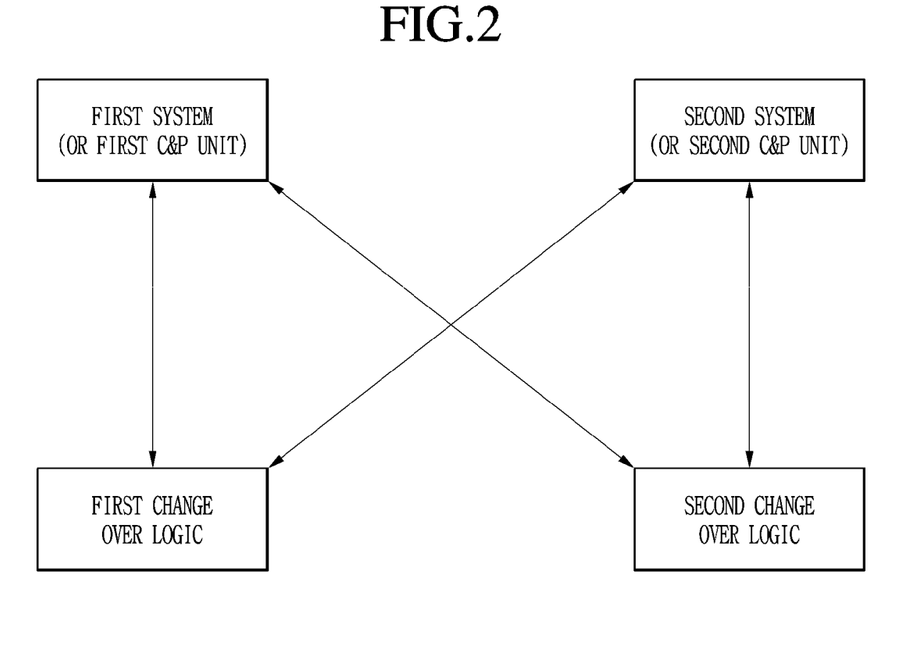
FIG. 2 represents a pair of systems including HVDC transmission systems and a pair of changeover logics (COL).

FIG. 2 represents a pair of systems including a pair of HVDC transmission systems and a pair of COLs.

In the following, two systems are represented by two C&P units, for example.

The pair of HVDC transmission systems includes two C&P units (a first C&P unit, and a second C&P unit) and two COLs (a first COL and a second COL). Which C&P unit is used in the HVDC transmission system is determined by the two COLs.

The two COLs respectively check whether to activate the first COL or the second COL and whether to activate the first C&P unit or the second C&P unit so that one COL is in an active state and the other COL is in the inactive state.

In this case, an active COL checks the activation of the two C&P units and a COL receiving an activation confirm signal has the right to change over.

In the following, the changeover method of a pair of HVDC transmission systems according to an embodiment is described in detail with reference to FIGS. 3 to 7.

In the embodiment to be described below, a system may include a C&P unit (not shown) which may perform the operations of controlling and protecting the entire HVDC transmission system.

Signals transmitted between systems and COLs may be transmitted through lines connected between COLs, between a COL and a system (e.g., C&P unit) and between systems. The line may be e.g., a field bus.

With reference to FIGS. 3 to 6, a method of setting an active system and an inactive system by a COL according to an embodiment in initial operation and in normal operation in a pair of systems is described.

Figure 3:
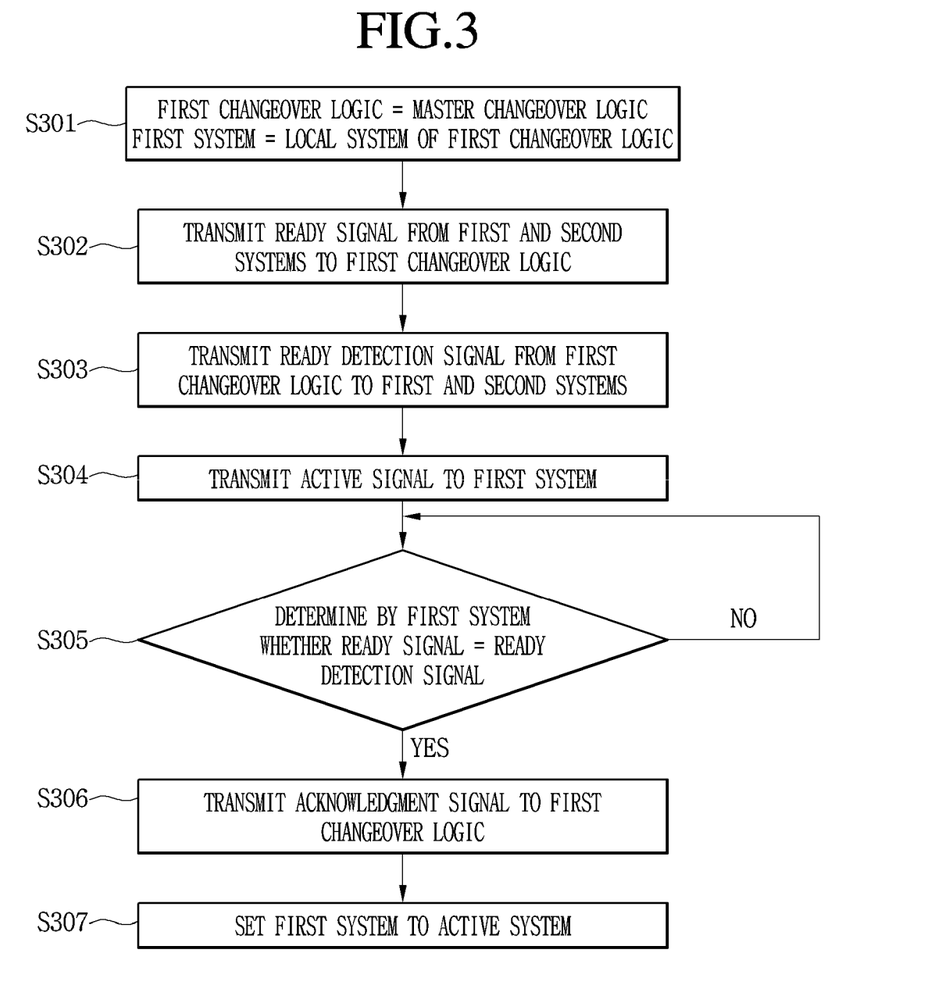
FIG. 3 is a flowchart of an embodiment in initial operation and in normal operation.

FIG. 3 is a flowchart of an embodiment in initial operation and in normal operation.

In initial operation, a master COL among the two COLs is defined as a first COL 3 and the local system of the master COL is defined as a first system 1 in step S301.

The master COL indicates one having a higher priority among the two COLs and the priority between COLs is set by an operator.

The local system indicates one installed closer to the master COL among the two systems.

The first COL 3 is a COL having the right to determine whether to operate which system among the first system 1 and the second system 2. That is, the first COL 3 is an active COL having an active state currently and is one that actually performs a changeover operation.

On the contrary, the second COL 4 is an inactive COL having an inactive state currently and is one being in a standby state actually.

The second COL 4 becomes an active COL instead of the first COL 3 when the first COL 3 has a fault or malfunctions, and the second COL 4 being the active COL is a COL that actually performs a changeover operation after having the active state. In the case of systems, the local system of the first COL 3 being the master COL in initial operation is defined as the first system 1. On the contrary, the remote system of the first COL 3 in consideration of a relationship with the first COL 3 is defied as the second system 2.

The remote system is a system corresponding to the local system, and a system installed farther than the first system 1 from the first COL 3 is defined ad the remote system.

Referring back to FIG. 3, each of the first system 1 and the second system 2 transmits ready signals to the first COL 3 in step S302.

When the first COL 3 receives the ready signal, the first COL 3 determines that the first system 1 and the second system 2 may perform necessary operations.

The ready signals transmitted to the first COL 3 by each of the first system 1 and the second system 2 may include pulse waves having a cycle of about 200 μs. When the first system 1 or second system 2 does not generate the ready signal for about 300 μs, the first COL 3 may determine that a system having no change for about 300 μs among the first system 1 and the second system 2 is a system that is not ready to operate.

Figure 4:
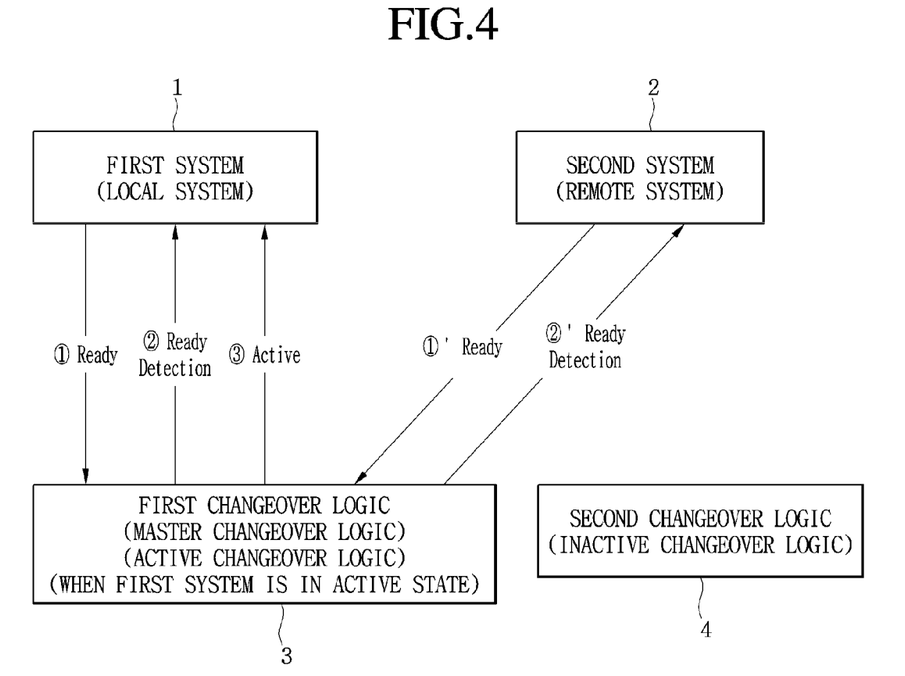
FIGS. 4, 5 and 6 represent signal exchanges between the pair of systems and a first COL in initial operation and in normal operation according to an embodiment.

Referring to FIG. 4, the first system 1 transmits a ready signal ① Ready to the first COL 3 through a line to which the first system 1 and the first COL 3 are connected, and the second system 2 transmits a ready signal ①' Ready to the first COL 3 through a line to which the second system 2 and the first COL 3 are connected.

When the first COL 3 receives the ready signals ① Ready and ①' Ready respectively from the first system 1 and the second system 2, the first COL 3 transmits ready detection signals ② Ready Detection and ②' Ready Detection respectively to the first system 1 and the second system 2 in step S303.

In the present embodiment, the ready detection signals ② Ready Detection, ②' Ready Detection are signals responsive to the read signals ① Ready and ①' Ready transmitted from each system to the COL, and the ready detection signals may include that the COL has detected that each system having transmitted the ready signal has been ready to operate.

The ready detection signal transmitted by the COL may include the same content as the ready signal transmitted from each system to the COL.

For example, when the ready signal is a sine wave having a cycle of about 200 μs and a maximum value of A, the ready detection signal may equally be a sine wave having the cycle of about 200 μs and the maximum value of A.

Then, as shown in FIGS. 4 to 12, the first system 1 and the second system 2 continues to transmit the ready signals to the first COL 3, and the first COL 3 continues to transmit the ready detection signals to the first system 1 and the second system 2, respectively.

Referring back to FIG. 3, when the first COL 3 transmits the ready signals to the first system 1 and the second system 2 respectively, the first COL 3 transmits an active signal to the first system 1 in step S304.

Referring to FIG. 4, the first COL 3 determines that the first system 1 being the local system of the first COL 3 needs to be activated, and transmits an active signal to the first system 1 in order to set the first system 1 to an active system.

Referring back to FIG. 3, when the first system 1 receives the active signal transmitted by the first COL 3, the first system 1 determines whether the ready signal transmitted by the first system 1 matches the ready detection signal received by the first system 1 in step S305.

As an example of methods of determining whether the ready signal matches the ready detection signal, the ready signal and the ready detection signal are sampled in units of about 10 μs within a range of about 200 μs to determine every 10 μs whether the output value of the ready signal is equal to the output value of the ready detection signal.

Until it is determined that the ready signal matches the ready detection signal, the first system 1 continues to determine whether the ready signal matches the ready detection signal.

When it is determined that the ready signal transmitted by the first system 1 matches the ready detection signal transmitted to the first system 1, the first system 1 transmits a confirm signal to the first COL 3 in step S306.

Figure 5:
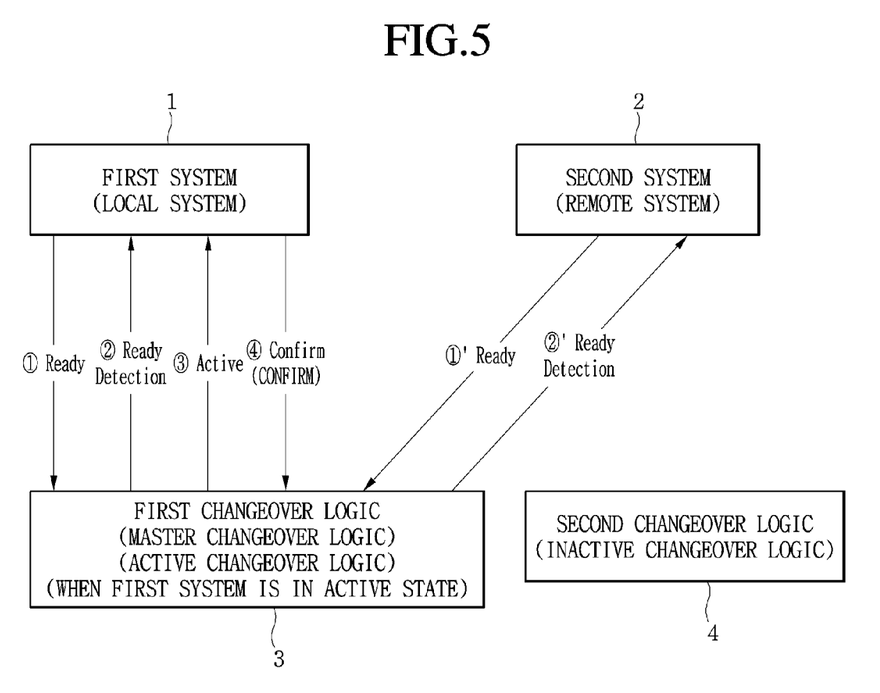

As shown in FIG. 5, the first system 1 receiving the active signal from the COL 3 transmits the confirm signal to the first COL 3.

The confirm signal represented in FIG. 5 is described below in detail.

The confirm signal according to the present embodiment includes that the ready detection signal transmitted to the first COL 3 matches the ready signal transmitted to the first system 1.

In the present embodiment, a system receiving the active signal transmits the confirm signal to a COL for a cycle of e.g., about 200 μs) and may not transmit the confirm signal after one cycle.

Referring back to FIG. 3, when the first COL 3 receives the confirm signal from the first system 1, the COL 3 sets the first system 1 having transmitted the confirm signal to an active system in step S307.

Figure 6:
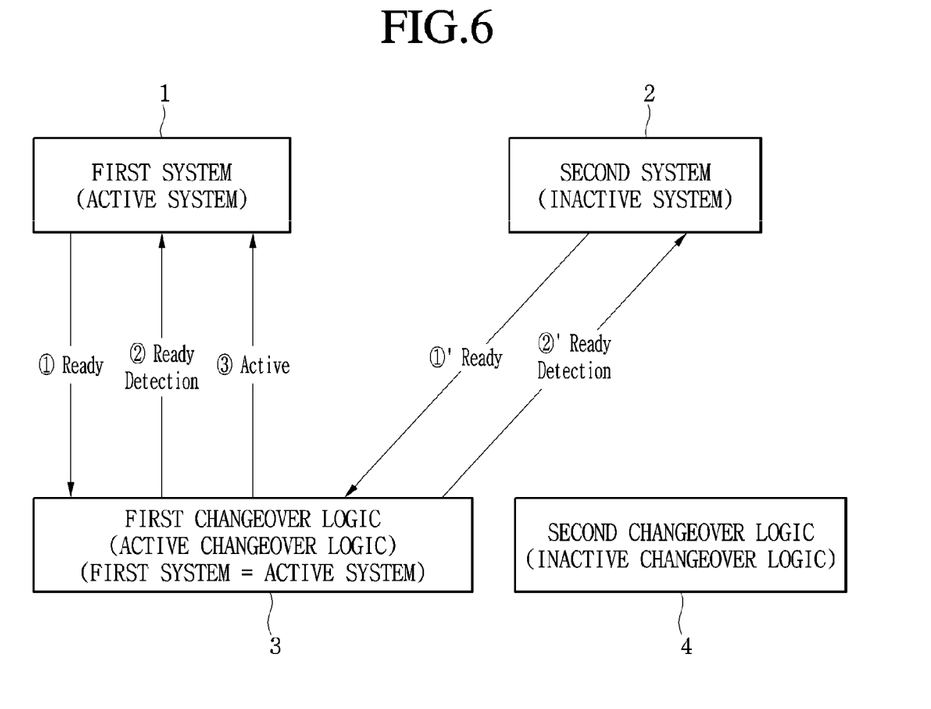

Referring to FIG. 6, the first COL 3 sets the first system 1 to the active system after receiving the confirm signal from the first system 1, and sets the second system 2 to an inactive system.

After setting the first system 1 to the active system, the first COL 3 continues to transmit the confirm signal to the first system 1.

After the first system 1 continues to receive the confirm signal from the first COL 3, the first system 1 performs an operation necessary for the entire HVDC transmission system as the active system until the first system 1 has a fault.

In the following, how an active COL obtains a fault signal and changes over a system is described with reference to FIGS. 7 to 12.

Figure 7:
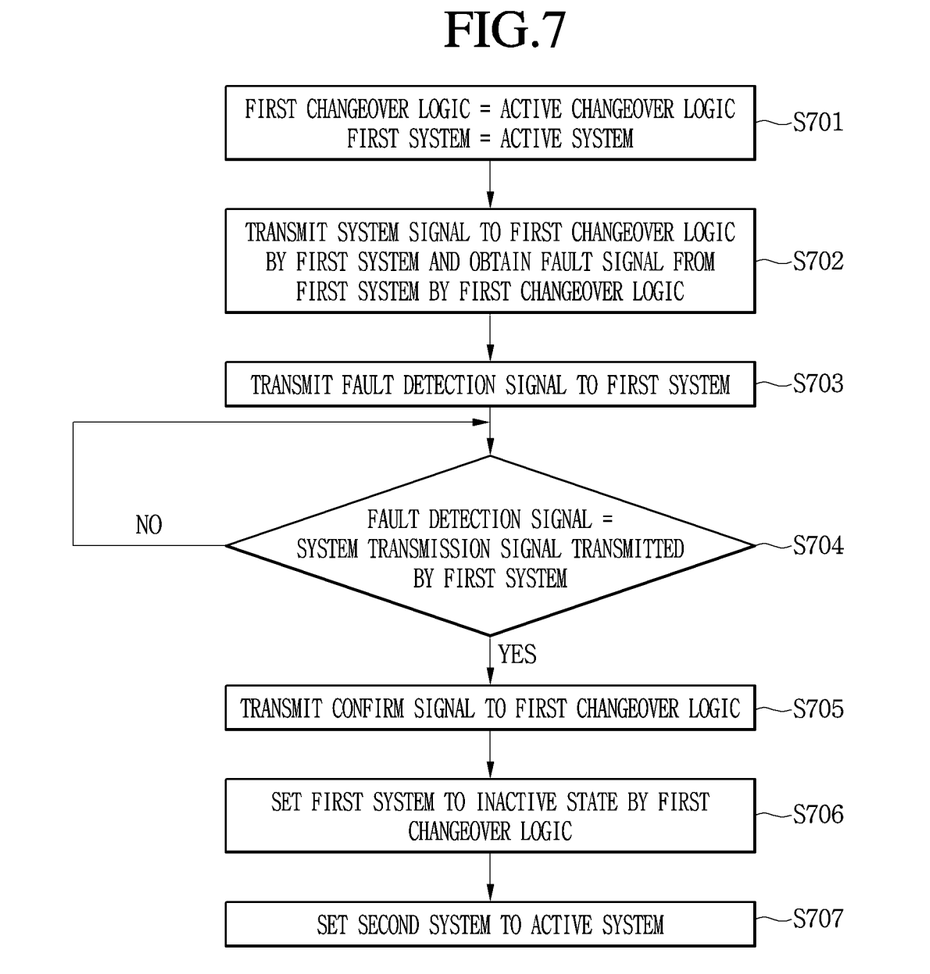
FIG. 7 is a flowchart of an operating method of the first COL when a fault signal is obtained according to an embodiment.

The first system 1 is a system set as an active system by the first COL 3 in initial operation and the first COL 3 is a COL set to an active C&P unit in step S701.

The first system 1 is a system actually operating in the entire HVDC transmission system, the first system 1 may include a first C&P unit (not shown), the second system 2 may include a second C&P unit (not shown), and the first and second C&P units perform the operations of controlling and protecting the entire HVDC transmission system.

The second system 2 is a system set to an inactive system in initial operation and is a system being in a standby state. When it is found that the first system 1 has a fault or malfunctions, the second system 2 is set to an active system by the first COL 3, and after the second system 2 is set to the active system, it performs an operation necessary for the entire HVDC transmission system (e.g., control and protection of the entire HVDC transmission system).

While the first system 1 operates as the active system, the first system 1 transmits a system signal to the first COL 3 and the first COL 3 obtains a fault signal from the first system 1 in step S702.

Figure 8:
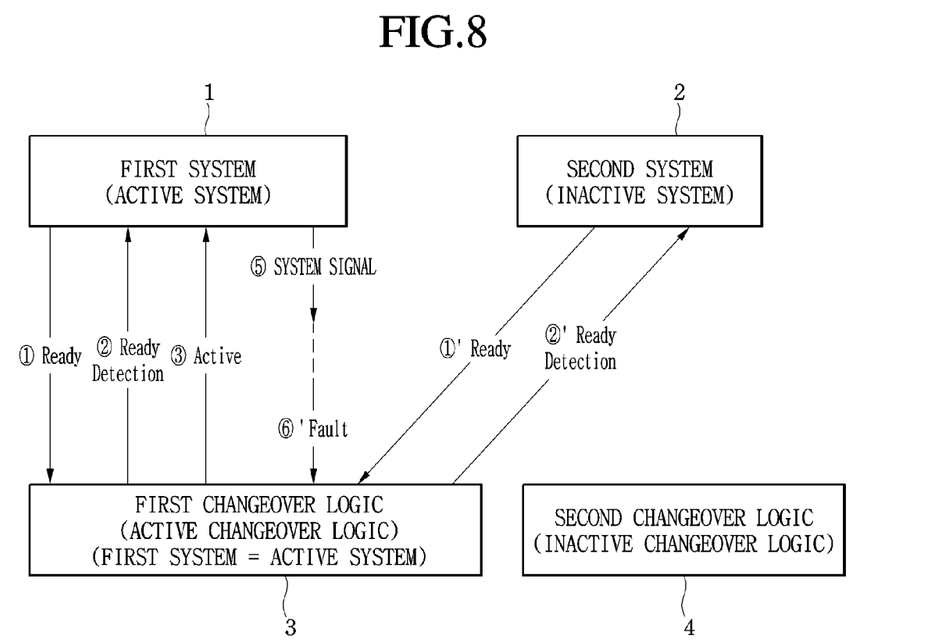
FIGS. 8, 9, 10, 11 and 12 represent signal exchanges between the pair of systems and the first COL in the flowchart of FIG. 7.

Referring to FIG. 8, the first system 1 transmits the system signal to the first COL 3, and the first COL 3 obtains the fault signal.

As discussed earlier, when the first system 1 has a fault, there is a case where the first system 1 transmits the fault signal to the first COL 3, but irrespective of whether the first system 1 has the fault, the first COL 3 may obtain the fault signal because there is noise due to a physical damage or defect on the line between the first system 1 and the first COL 3 even though the first system 1 has transmitted a normal signal system signal.

That is, the system signal in FIG. 8 may also be obtained as the fault signal by the first COL 3.

However, since the system signal itself in FIG. 8 is a normal signal having no fault but the noise due to a physical damage or defect on the line through the system signal is transmitted is added to the system signal, the first COL 3 may fail to obtain the system signal and may obtain the fault signal which has noise added to the system signal.

Referring back to FIG. 7, when the first COL 3 receives the fault signal from the first system 1, the COL 3 transmits a fault detection signal to the first system 1 in step S703.

The first COL 3 transmits the fault detection signal including the same content as the fault signal.

For example, when the fault signal is a sine wave having a cycle of about 200 μs and a maximum value of A, the fault detection signal is a sine wave having the cycle of about 200 μs and the maximum value of A as well.

Figure 9:
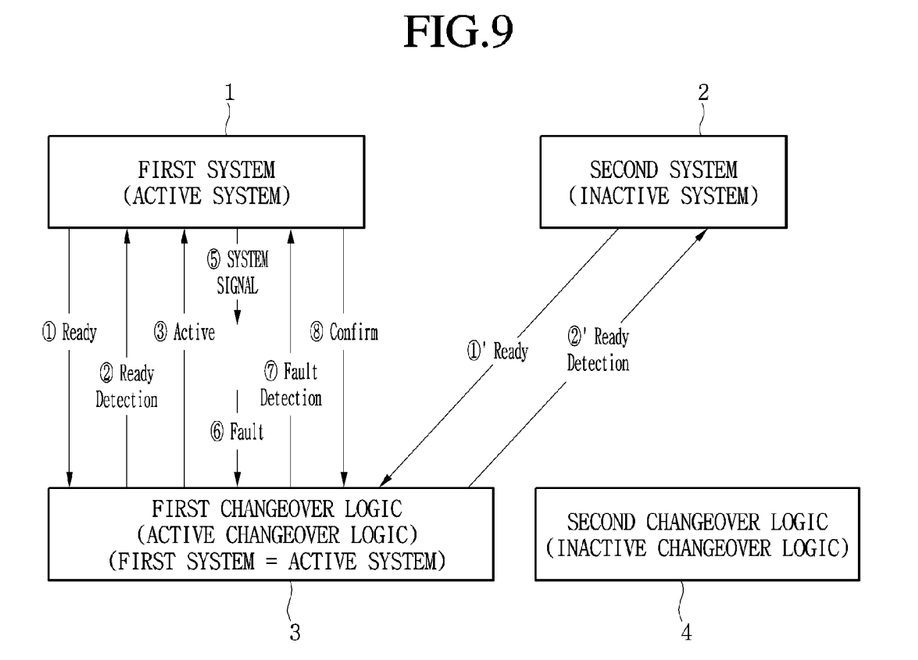

Referring to FIG. 9, after the first COL 3 obtains the fault signal in FIG. 8, the first COL 3 transmits the fault detection signal in FIG. 9 obtained by the first COL 3 and equal to the fault signal in FIG. 8 to the first system 1.

Referring back to FIG. 7, when the first system 1 receives the fault detection signal, the first system 1 determines whether the fault detection signal transmitted by the first COL 3 is the same as the system signal transmitted by the first system 1 before the obtaining of the fault signal by the first COL 3 in step S704.

Referring to FIG. 9, after the first system 1 receives the fault detection signal, the first system 1 determines whether the fault detection signal and the system signal transmitted by the first system 1 in FIG. 8 are the same each other.

In FIG. 9, it is assumed that the fault signal obtained by the first COL 3 and the fault detection signal transmitted by the first COL 3 are the same.

Referring to FIG. 7, when it is determined that the fault detection signal and the system signal are the same, the first system 1 transmits the confirm signal to the first COL 3 in step S705.

As shown in FIG. 9, when it is determined that the fault detection signal and the system signal are the same, the first system 1 transmits to the first COL 3 the confirm signal representing that the fault detection signal and the system signal are the same.

Referring back to FIG. 7, when the first COL 3 receives the confirm signal or fails to receive the confirm signal for a certain time, the first COL 3 determines that the first system 1 needs to be set to an inactive state in step S706 and the second system 2 needs to be an active system in step S707.

The certain time may be, for example, 1.5 times a cycle of the confirm signal and, for another example, about 300 μs when a cycle is about 200 μs.

The reason why the first COL 3 sets the first system 1 to an inactive state not only when the first COL 3 receives the confirm signal but also when the first COL 3 fails to receive the confirm signal for a certain time, is because the first system 1 may actually have a fault and thus fail to transmit the confirm signal.

When the first system 1 has a fault but fails to transmit a confirm signal to the first COL 3, it is possible to increase the reliability of the entire system through the operation of forcibly changing over the system.

Figure 10:
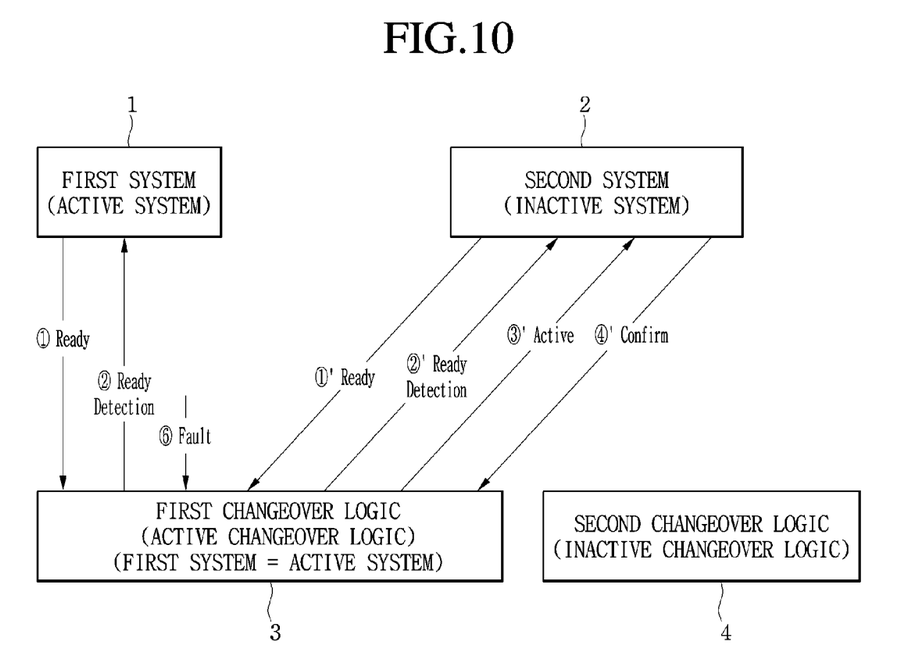

Referring to FIG. 10, the first COL 3 receiving the confirm signal in FIG. 9 determines that the first system 1 needs to be set to an inactive system and the second system 2 needs to be an active system, and transmits the confirm signal to the second system 2.

When the second system 2 receiving an active signal determines that the ready signal transmitted by the second system 2 matches the ready detection signal transmitted to the second system 2, the second system 2 transmits the confirm signal to the first COL 3.

Figure 11:
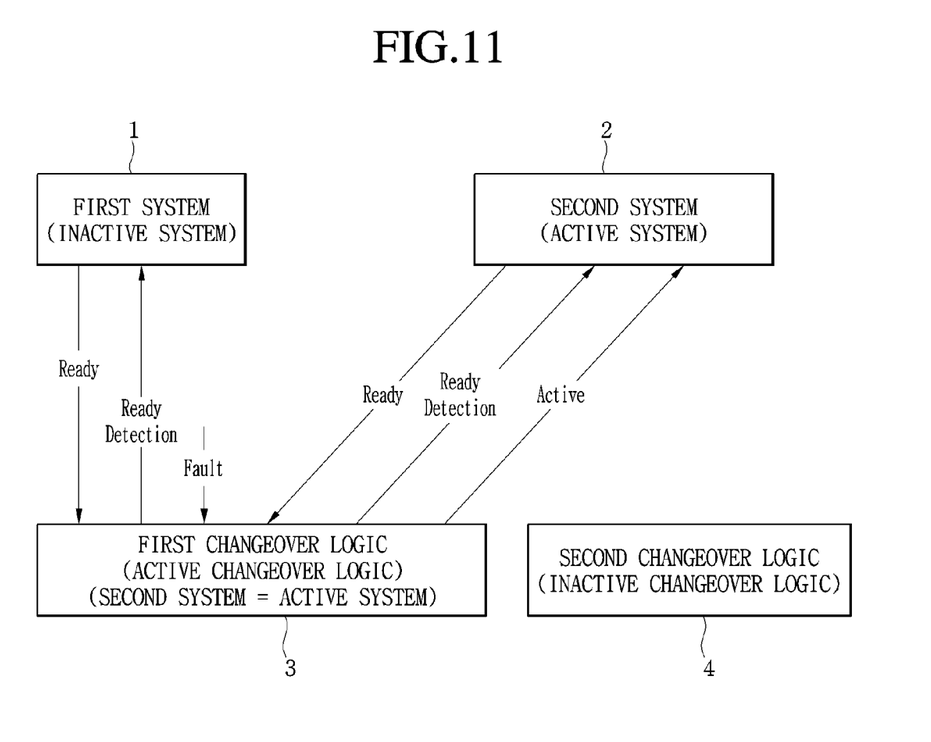

As shown in FIG. 11, the first COL 3 receiving the confirm signal transmitted by the second system 2 sets the second system 2 to an active state and continues to transmit the active signal to the second system 2.

Figure 12:
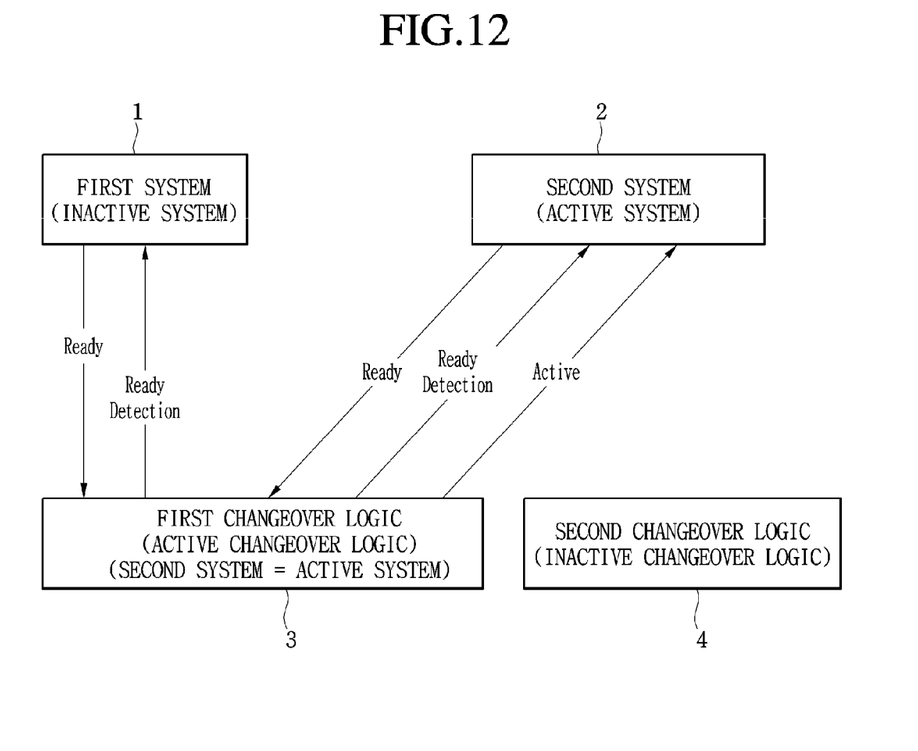

Then, the second system 2 set to the active system continues to perform operations needed as the active system in the entire HVDC transmission system, as shown in FIG. 12.

As shown in FIG. 12, although a fault signal transmitted from the first system 1 to the first COL 3 is not obtained, the first COL 3 continues to maintain the state of the second system 2 in an active state and the state of the first system 1 in an inactive state. That is, the first system 1 and the second system 2 are not changed over and the second system 2 continues to perform operations as the active system.

The embodiments allow the COLs to be stably maintained and although undesired fault signals are instantly input by a system to the COLs, the COLs may stably handle these signals without significantly affecting the entire changeover time, and it is possible to enhance the stability and reliability of the system by preventing undesired changeover operations.

The above descriptions are only examples of the technical spirit of embodiments, so a person skilled in the art may implement various modifications and variations without departing from the spirit and scope of the embodiments.

Thus, embodiments disclosed herein are intended not to limit but to describe the technical spirit of the present invention and the scope of the technical spirit of the present invention is not limited to such embodiments.

The protective scope of embodiments is defined by the appended claims, and all technical spirits within the equivalent scope are construed as being included in the scope of the right of the embodiments.

What is claimed is:

1. A changeover method of a high voltage direct current (HVDC) transmission system comprising a first system, a second system, a first changeover logic (COL), and a second COL, the changeover method comprising:
   setting the first system to an active state and the second system to an inactive state;
   transmitting a ready signal from the first system to the first COL;
   transmitting a ready detection signal and an active signal from the first COL to the first system, in response to the ready signal;
   transmitting a first confirm signal from the first system to the first COL in response to the active signal when the ready detection signal matches the ready signal;
   transmitting a system signal from the first system to the first COL;
   obtaining a fault signal by the first COL after transmission of the system signal from the first system to the first COL;

transmitting a fault detection signal from the first COL to the first system in response to the obtained fault signal;

determining, by the first system, whether the system signal and the fault detection signal are the same, wherein the system signal includes the fault signal when the first system has a fault and the fault detection signal is equal to the fault signal;

transmitting a second confirm signal from the first system to the first COL when the system signal and the fault detection signal are determined to be the same at the first system; and changing, by the first COL, the first system from the active state to the inactive state and changing the second system from the inactive state to the active state, in response to the second confirm signal.

2. The changeover method according to claim 1, further comprising changing, by the first COL, the first system to the inactive state and changing the second system to the active state, when the confirm signal is not received by the first COL for a time equal to or longer than a critical time after the fault detection signal is transmitted by the first COL.

3. The changeover method according to claim 1, wherein the obtaining of the fault signal by the first COL comprises obtaining the fault signal when the first COL fails to receive a specific signal transmitted by the first system.

4. The changeover method according to claim 1, further comprising maintaining the inactive state of the first system and the active state of the second system even when the fault signal is not obtained by the first COL after the second system is changed to the active state.

5. The changeover method of claim 1, further comprising transmitting another active signal to the second system to continue to perform an operation for the HVDC transmission system when the second system is changed from the inactive state to the active state.

* * * * *